(12) United States Patent
Dalcher et al.

(10) Patent No.: US 8,627,305 B1
(45) Date of Patent: Jan. 7, 2014

(54) SYSTEM, METHOD, AND COMPUTER PROGRAM PRODUCT FOR HOOKING CODE INSERTED INTO AN ADDRESS SPACE OF A NEW PROCESS

(75) Inventors: Gregory William Dalcher, Tigard, OR (US); Jonathan L. Edwards, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 971 days.

(21) Appl. No.: 12/410,191

(22) Filed: Mar. 24, 2009

(51) Int. Cl.
*G06F 9/44* (2006.01)

(52) U.S. Cl.
USPC ............................ 717/163; 717/124; 717/127

(58) Field of Classification Search
USPC ............................ 717/107, 162–168; 713/2; 715/804–805; 719/315–316, 330–332
See application file for complete search history.

(56) References Cited

U.S. PATENT DOCUMENTS

| | | | | |
|---|---|---|---|---|
| 7,028,309 B2 * | 4/2006 | Ward et al. | ...................... | 719/328 |
| 7,100,123 B1 * | 8/2006 | Todd et al. | ..................... | 715/862 |
| 7,213,249 B2 * | 5/2007 | Tung Loo et al. | ............. | 719/330 |
| 7,472,384 B1 * | 12/2008 | Beloussov et al. | ............ | 717/168 |
| 7,676,798 B2 * | 3/2010 | Snover et al. | ................. | 717/139 |
| 7,703,081 B1 * | 4/2010 | Buches | .......................... | 717/127 |
| 7,904,886 B2 * | 3/2011 | Dufour et al. | ................. | 717/124 |
| 8,015,558 B1 * | 9/2011 | Beloussov et al. | ............ | 717/168 |
| 2002/0056076 A1 * | 5/2002 | Made | ............................ | 717/129 |
| 2005/0039190 A1 * | 2/2005 | Rees et al. | ..................... | 719/316 |
| 2006/0156285 A1 * | 7/2006 | Jensen et al. | .................. | 717/120 |
| 2006/0277539 A1 * | 12/2006 | Amarasinghe et al. | ....... | 717/168 |
| 2007/0118350 A1 * | 5/2007 | van der Made | ................. | 703/22 |
| 2007/0261044 A1 * | 11/2007 | Clark | ............................ | 717/162 |
| 2008/0209557 A1 * | 8/2008 | Herley et al. | ................... | 726/23 |

\* cited by examiner

*Primary Examiner* — Chat Do
*Assistant Examiner* — Sergio J Curbelo, III
(74) *Attorney, Agent, or Firm* — Wong, Cabello, Lutsch, Rutherford & Brucculeri, LLP

(57) ABSTRACT

A system, method, and computer program product are provided for hooking code inserted into an address space of a new process. In use, creation of a process is identified. Additionally, code is inserted into an address space of the process. Still yet, at least one module being loaded in association with the process is identified. Further, the code is hooked at an entry point of the at least one module based on a determination of whether the at least one module includes a predefined module.

17 Claims, 7 Drawing Sheets

SYSTEM, METHOD, AND COMPUTER PROGRAM PRODUCT FOR HOOKING CODE INSERTED INTO AN ADDRESS SPACE OF A NEW PROCESS

FIELD OF THE INVENTION

The present invention relates to hooking code, and more particularly to hooking code in association with a new process.

BACKGROUND

Traditionally, code has been hooked in association with a new process for executing the code in association with the new process. Hooking in association with a new process has generally been utilized in an attempt to execute the hooked code early within execution of an executable associated with the new process. Unfortunately, conventional techniques for hooking code in association with a new process have exhibited various limitations.

Just by way of example, one of such conventional techniques has included intercepting a thread creation process and blocking the same while injecting desired code. However, such technique is generally limited since the interception of the thread creation process relies on operating system behavior which changes between versions. Another conventional technique has included intercepting a DLL load mechanism and injecting a desired thread for execution thereof. While libraries are loading, however, loader code within a library (e.g. ntdll.dll) may lock its associated data structures, such that the injected thread is required to wait until the locks are released before the injected code is able to load its own libraries. Accordingly, initialization of the injected code and initialization of the process may run in parallel such that the injected code is prevented from executing at an earlier point within the process.

There is thus a need for addressing these and/or other issues associated with the prior art.

SUMMARY

A system, method, and computer program product are provided for hooking code inserted into an address space of a new process. In use, creation of a process is identified. Additionally, code is inserted into an address space of the process. Still yet, at least one module being loaded in association with the process is identified. Further, the code is hooked at an entry point of the at least one module based on a determination of whether the at least one module includes a predefined module.

DETAILED DESCRIPTION

Figure 1:
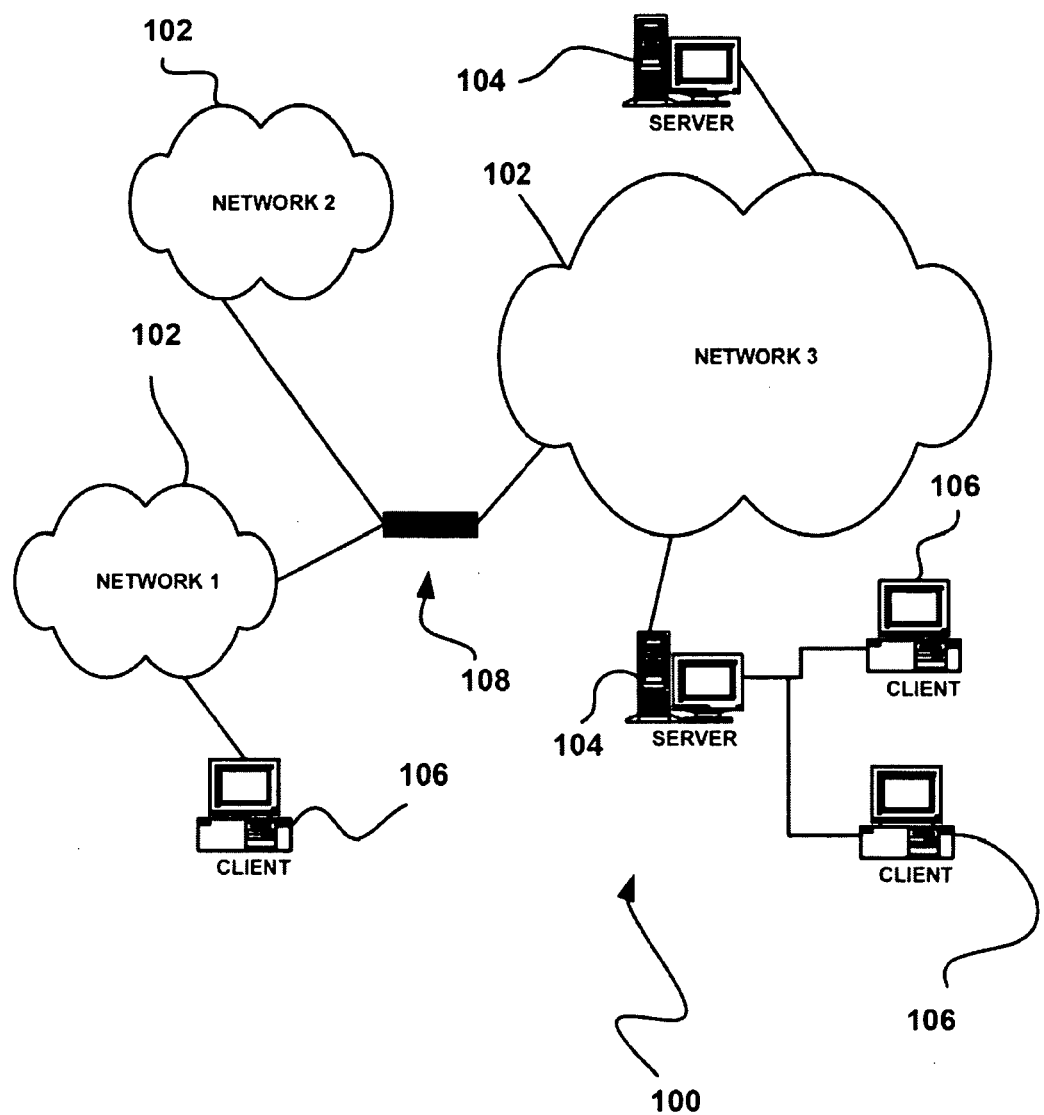
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
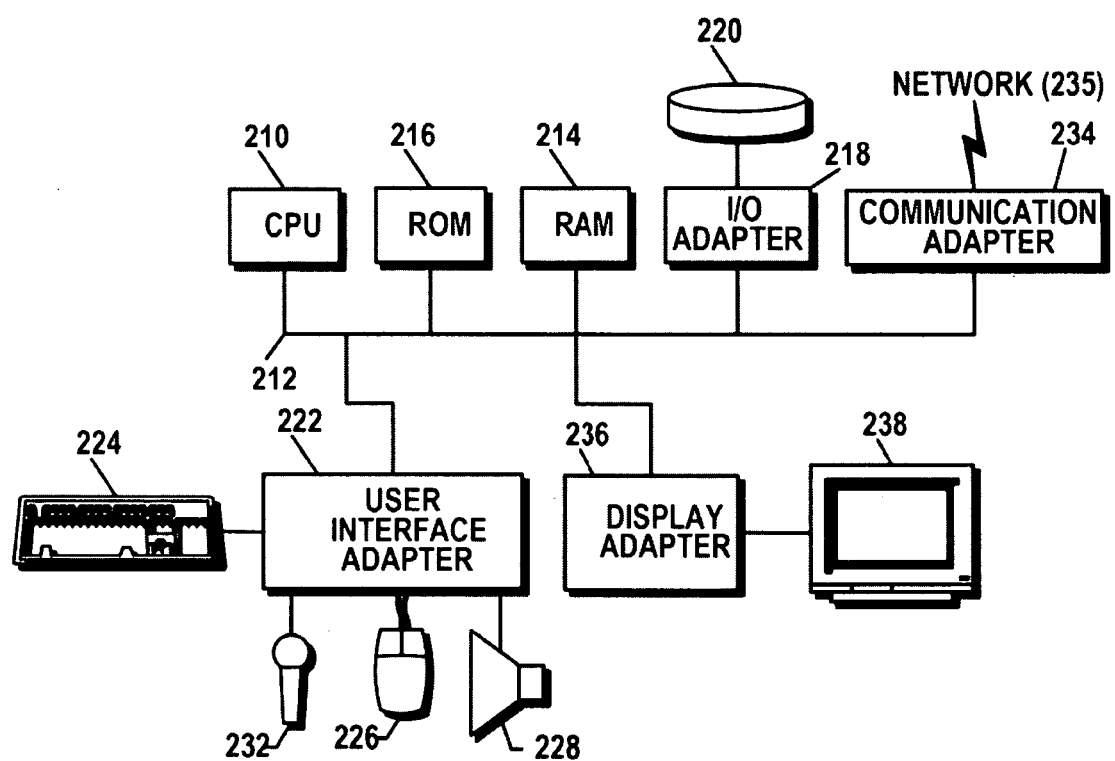
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
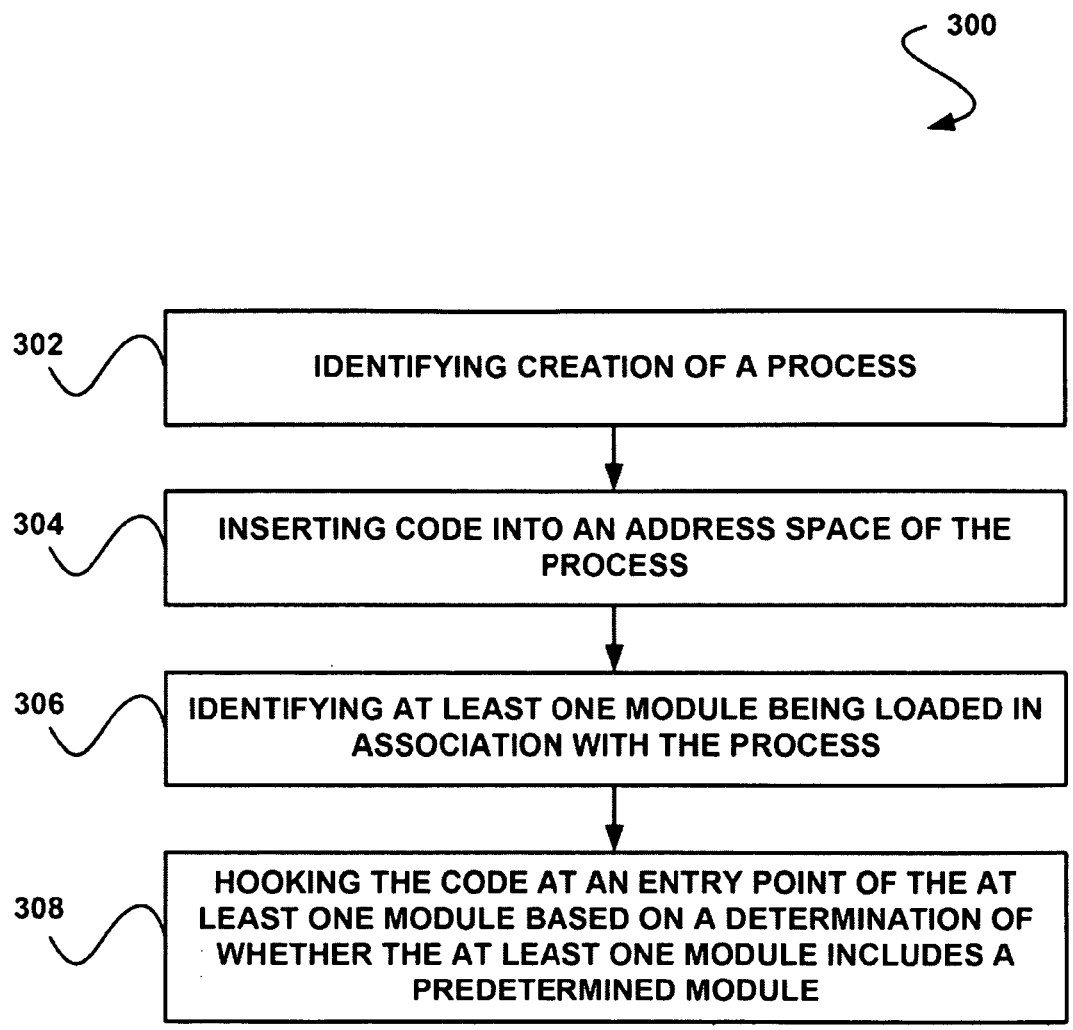
FIG. 3 shows a method for hooking code inserted into an address space of a new process, in accordance with one embodiment.

FIG. 3 shows a method 300 for hooking code inserted into an address space of a new process, in accordance with one embodiment. As an option, the method 300 may be carried out in the context of the architecture and environment of FIGS. 1 and/or 2. Of course, however, the method 300 may be carried out in any desired environment.

As shown in operation 302, creation of a process is identified. The process may include any newly created process, with respect to the present description. Just by way of example, the process may include an operating system process.

In one embodiment, the creation of the process may be identified utilizing a driver that is automatically notified upon creation of the process. For example, the driver may include a device driver. In another embodiment, the creation of the process may be identified as a result of a module (e.g. executable, library, etc.) being loaded.

Of course, however, the creation of the process may be identified in any desired manner. Further, identifying the creation of the process may include identifying the process itself. To this end, by identifying the creation of the process, a new process (i.e. the created process) may be identified.

Additionally, code is inserted into an address space of the process, as shown in operation 304. With respect to the present description, the code may include any executable code capable of being hooked for execution thereof. In various embodiments, the code may include code for monitoring for unwanted activity (e.g. malware, etc.), code of an intrusion prevention (IPS) system, code of a anti-virus scanner, code for loading libraries utilized by an application other than an executable of the process, etc.

The address space of the process may include any portion of memory utilized by the process. For example, the address space of the process may include address space apportioned to the process for use by the process. For example, the address space may store a main executable, libraries, etc. associated with the process.

In one embodiment, the code may be inserted into the address space of the process in response to the identification of the creation of the process. For example, the code may be inserted into the process as a result of an identification of a module of the process being loaded. Accordingly, the code may be inserted into the address space prior to the execution of the process, as an option.

In another embodiment, inserting the code into the address space may include inserting the code into an empty portion of the address space. In still yet another embodiment, the address space may include a range of addresses, such that the code may be inserted into any subset of the range of addresses. Of course, however, the code may be inserted into the address space in any desired manner.

Furthermore, as shown in operation 306, at least one module being loaded in association with the process is identified. As noted above, the module may include a library, such as a dynamic link library (DLL). Thus, for example, the code inserted into the address space of the process may optionally be utilized for loading libraries other than the library included in the module. Just by way of example, a first portion of the code may load the libraries loaded and a second portion of the code may utilize the libraries enabling various functionality of the second portion of the code.

As another option, the module may include a main executable. Such main executable may utilize the library (e.g. during execution of the main executable, etc.). Of course, however, the module may include any code, data, etc. capable of being loaded (e.g. linked, etc.), or even already loaded, with respect to the process.

Optionally, the module may be identified by a device driver (e.g. the device driver that identified the creation of the process). As another option, the module may be identified based on a mapping of the module into the address space of the process. Since such mapping may be performed prior to the execution of the process, the module may be identified prior to the execution of the process, in one embodiment.

Moreover, the code is hooked at an entry point of the at least one module based on a determination of whether the at least one module includes a predetermined module. Note operation 308. The entry point may include any portion of the module which initiates execution of the module (e.g. where execution of the module would start), such as a first predetermined number of code instructions of the module, etc.

In one embodiment, the code may be hooked at the entry point of the module by modifying executable at the entry point of the module (e.g. the first predetermined number of code instructions of the module) to transfer control to the code upon execution of the executable code. For example, such executable code at the entry point of the module may be replaced with an instruction (or a set of instructions) to transfer control to the code. Such instruction may include a jump instruction, as an option. To this end, by hooking the code at the entry point of a module, the code may be executed upon an attempt to initiate execution the module.

It should be noted that hooking the code at an entry point of the at least one module may include hooking different portions of the code, where each portion of the code is hooked at an entry point of a different module. For example, each portion of the code may provide different functionality when executed. In this way, different functionality of the code may be provided at the entry points of the different modules being loaded in association with the process, as an option.

Still yet, the code may be hooked at an entry point of the at least one module based on any determination of whether the at least one module includes a predetermined module. In one embodiment, the code may be hooked at an entry point of each module identified as being loaded in association with the process if it is determined that such module includes a predetermined module (e.g. in a list of predetermined modules).

With respect to such embodiment, the predetermined module may include a main executable associated with the process. In this way, the code may (e.g. always) be hooked at an entry point of the main executable. Hooking the code at the entry point of the main executable may ensure that the code is executed via the process (at the entry point of the main executable) even when libraries or any other modules are not loaded in association with the process.

As another option, the predetermined module may include a 32-bit module if the code is 32-bits. Just by way of example, if the process is associated with a 64-bit operating system and the code is 32-bits, the code may optionally only be hooked at a 32-bit module, thus preventing the 32-bit code from being hooked at a 64-bit module of the 64-bit operating system. As another option, if the code is 64-bits, the predetermined module may include a 64-bit module, for ensuring that the 64-bit code is hooked at a 64-bit module.

As yet another option, the predetermined module may include a module predetermined to not be referenced by the code. For example, a module that does not provide functionality which is critical to the code may be hooked. In one embodiment, the aforementioned module may be hooked since execution of such module may not be necessary for the code to correctly execute.

In another embodiment, the code may be hooked at an entry point of each module identified as being loaded in association with the process if it is determined that such module does not include a predetermined module. With respect to such embodiment, the predetermined module may optionally include a module predetermined to be reference by (e.g. utilized by) the code, such as a module with functionality that is critical to the code. For example, the predetermined module may include the ntdll.dll library. Thus, as an option, the code may be prevented from being hooked at an entry point of a module if execution of the module is necessary due to use of such module by the code dining execution.

Of course, while various examples of predetermined modules have been described hereinabove, it should be noted that the predetermined modules may include any modules predetermined based on the functionality of the code, etc. As noted above, the identification of the module(s) being loaded in association with the process may be performed prior to execution of the process. In this way, the hooking of the code at the entry point of the module(s), based on the determination of whether each module includes a predetermined module, may also be performed prior to execution of the process, such that it may optionally be ensured that the code is executed prior to execution of any modules associated with the process (e.g. if the modules all include predetermined modules at which the code is hooked), only after predetermined modules at which the code is not hooked, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
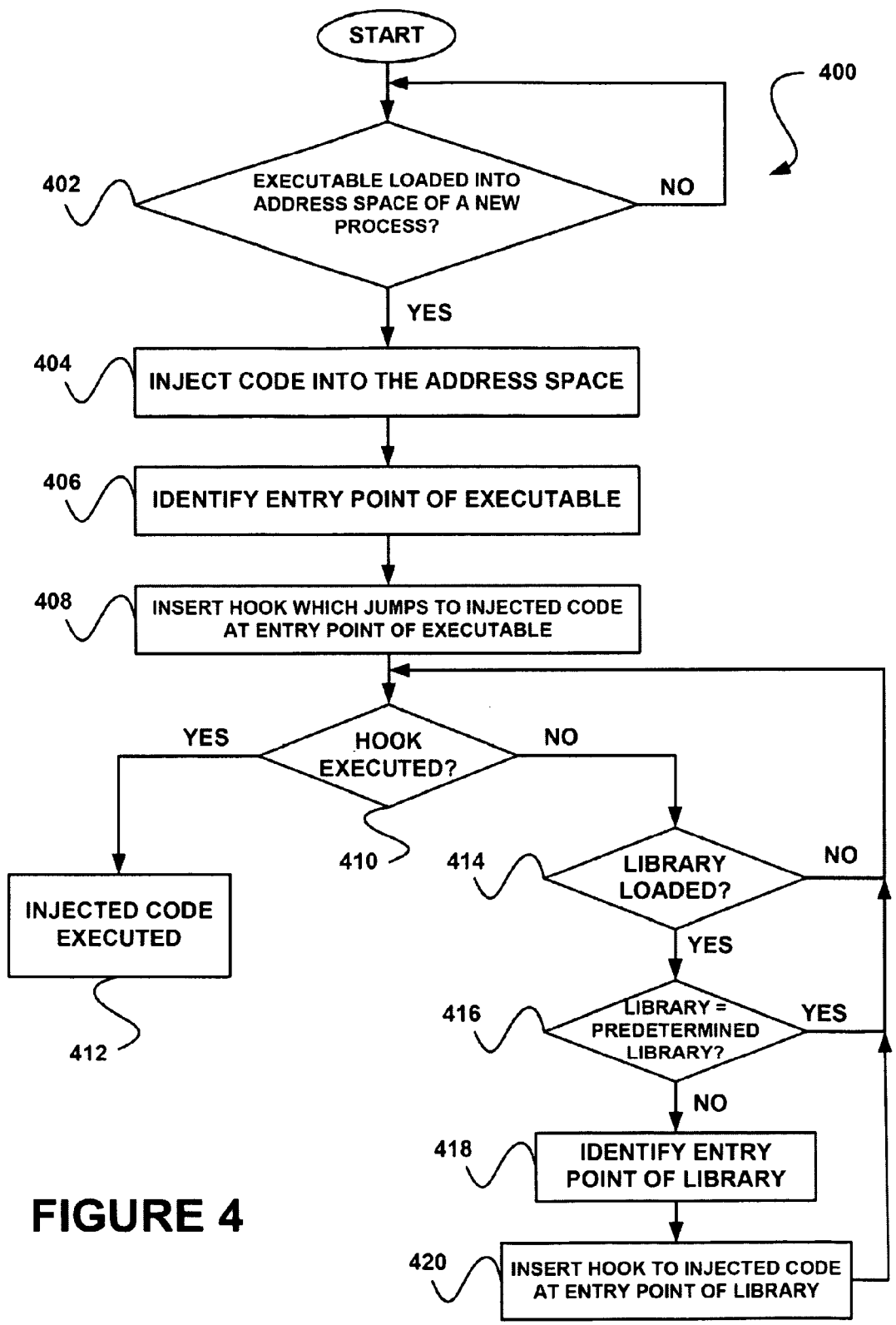
FIG. 4 shows a method for hooking code inserted at an entry point of an executable and at least one library of a new process, in accordance with another embodiment.

FIG. 4 shows a method 400 for hooking code inserted at an entry point of an executable and at least one library of a new process, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether an executable is loaded into an address space of a new process. With respect to the present embodiment, the executable includes any executable code which has not yet been executed via the new process. Optionally, the determination may be made by determining whether a driver has been notified of the new process, whether the executable is being loaded, etc.

If it is determined that an executable is not loaded into an address space of a new process, the method 400 continues to wait. If, however, it is determined that an executable is loaded into an address space of a new process, code is injected into the address space. Note operation 404. Injecting the code may include inserting (e.g. storing, writing, etc.) the code into the address space in any desired manner.

Further, an entry point of the executable is identified, as shown in operation 406. In one embodiment, the entry point may be identified by analyzing a header of the executable. For example, the header may include a field indicating the entry point of the executable (e.g. indicating a portion of the executable, such as an instruction, etc., at which execution of the executable begins). Of course, however, the entry point may be identified in any desired manner.

Still yet, as shown in operation 408, a hook which jumps to the injected code is inserted at the entry point of the executable. For example, the hook may include a jump instruction. In this way, upon an attempted execution of the executable, the injected code may be executed in place of the executable.

Moreover, it is determined in decision 410 whether the hook has executed. Determining whether the hook has executed may include determining whether the hook has been called within the process, etc. If the hook is not determined to have executed, it is further determined whether a library is being loaded in association with the process (see decision 414). The library may include a DLL, for example.

If it is determined that a library is not being loaded in association with the process, the method 400 again determines whether the hook has executed (in decision 410). If, however, it is determined that a library is being loaded in association with the process, it is determined whether the library is a predetermined library. Note decision 416.

With respect to the present embodiment, the predetermined library may include a library for which it is predetermined that the injected code is not to be hooked at an entry point thereof. For example, the predetermined library may include a library referenced (e.g. utilized) by the injected code, such that execution of the library is necessary (and thus is not to be hooked) in order for the functionality of the injected code to be fully realized. In one embodiment, determining whether the library is a predetermined library may include determining whether the library is included in a list of predetermined libraries.

If it is determined that the library includes a predetermined library, the injected code is not hooked and the method 400 again determines whether the hook has executed (in decision 410). In response to a determination that the library does not include a predetermined library, an entry point of the library is identified. Note operation 418.

In one embodiment, the entry point may be identified by analyzing a header of the library. For example, the header may include a field indicating the entry point of the library (e.g. indicating a portion of the library, such as an instruction, etc., at which execution of the library begins). Of course, however, the entry point of the library may be identified in any desired manner.

In addition, a hook to the injected code is inserted at the entry point of the library, as shown in operation 420. For example, the hook may include a jump instruction. In this way, upon an attempted execution of the library, the injected code may be executed in place of the library.

Furthermore, in response to the insertion of the hook to the injected code at the entry point of the library, it is yet again determined whether a hook has executed (in decision 410). Determining whether a hook has executed may include determining whether the hook at the entry point to the executable or the hook at the entry point to a library has executed. If it is determined that the hook has not executed, it is determined whether another library is being (or has) loaded (see decision 414).

In this way, the injected code may continue to be hooked at entry points to libraries associated with the new process until one of the hooks (at the executable or at any of the libraries) is executed. Once it is determined that a hook has executed (in decision 410), the injected code is executed. Note operation 412. The injected code may include various functionality that is realized during execution thereof.

In one embodiment, during execution of the injected code, the injected code may undo (e.g. remove) the hook inserted at the entry point to the executable and each hook inserted into an entry point of a library. As an option, the injected code may undo such hooks based on a list of hooks. For example, as each hook is inserted at the executable and libraries, such insertion may be logged in the list of hooks (e.g. including information on each hook such as a location of the hook, etc.). The injected code may then undo each hook indicated in the list (e.g. using the information on each hook).

In another embodiment, during execution of the injected code, the injected code may perform an initialization needed for hooking. For example, the injected code may load any libraries referenced by the injected code which have not yet been loaded within the process. In yet another embodiment, during execution of the injected code, the injected code may monitor for unwanted activity, but of course may perform any other desired functionality.

It should be noted that while the method 400 has been described in a manner in which the injected code is hooked at an entry point of the executable prior to being hooked at an entry point of a library, other embodiments are contemplated in which the injected code is hooked at an entry point of a library prior to being hooked at an entry point of the executable. For example, the method 400 may assume that the executable is loaded into the address space of the process prior to a library being loaded into such address space. However, if a library is loaded into the address space of the process prior to the executable being loaded therein, the injected code may be hooked at an entry point of the library prior to being hooked at an entry point of the executable.

In one exemplary embodiment, a Microsoft™ Windows™ operating system may start a process. The process may be started by placing code of a main executable into an address space of a new process, placing code for ntdll.dll into the address space, starting a thread which runs loader code into the ntdll.dll, and using the loader code to examine a header of the executable to determine other DLLs that are needed by the main executable. Further, the new process may also be started by loading each DLL code into address space, calling an entry point of each DLL, and calling an entry point of the executable. As an option, a device driver may optionally be notified during the placing of the code of a main executable into an address space of a new process, the placing of the code for ntdll.dll into the address space, the starting of a thread which runs loader code into the ntdll.dll, and the loading of each DLL code into address space.

However, since malicious code may run from an entry point of a DLL, code may be injected at the entry point of such DLL for monitoring, preventing, etc. execution of the DLL. For example, when loading of the executable is identified, the code may be injected into the address space of the new process. In addition, when loading of the executable is identified and loading of any DLLs are identified, a header of the executable and each identified DLL may be analyzed to identify the entry point of the associated executable/DLL.

The entry point may thus be overwritten with a transfer control instruction which jumps to the injected code, such that the injected code may be hooked at the entry point. As an option, the overwritten code may be stored elsewhere, such that it may be restored when the hook is removed after execution of the injected code has begun. It should be noted that predetermined DLLs, such as ntdll.dll, may not have their associated entry points overwritten with the transfer control instruction which jumps to the injected code.

Just by way of example, ntdll.dll may be excluded from having a hook placed therein because it may run early enough in the process such that execution of the injected code is not desired that early, because it may be predetermined to be non-malicious, and because it may be critical to the functionality of the injected code. In addition, the entry point to the executable and each DLL may be hooked since it may not necessarily be known before execution of the injected code begins how many DLLs will load, and since it may be possible that only the executable and ntdll.dll will load via the process.

Further, when a DLL entry point is executed (e.g. if no DLLs are loaded), the entry point of the executable may be executed, such that the injected code executes (as a result of the hook to the injected code). The execution of the injected code may allow all the other entry point hooks to be undone and for initialization needed for hooking to be performed. Also, if other DLLs load after the execution of the injected code, such DLLs may be ignored (i.e. not hooked, etc.) since the injected code for monitoring for malicious activity may already be executing in a manner such that activity of the DLLs may be monitored via the injected code.

FIGS. 5A-5E show an address space 500 of a new process in which code is inserted, in accordance with yet another embodiment. As an option, the method 400 may be implemented in the context of the architecture and environment of FIGS. 1-3. Of course, however, the method 400 may be implemented in any desired environment. It should also be noted that the aforementioned definitions may apply during the present description.

Figure 5A:
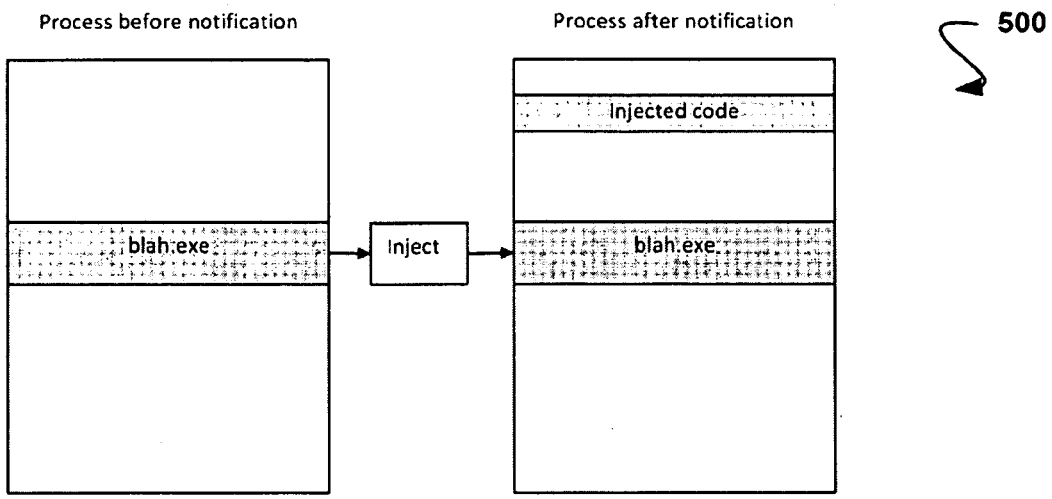
FIGS. 5A-5E show an address space of a new process in which code is inserted, in accordance with yet another embodiment.
Figure 5B:
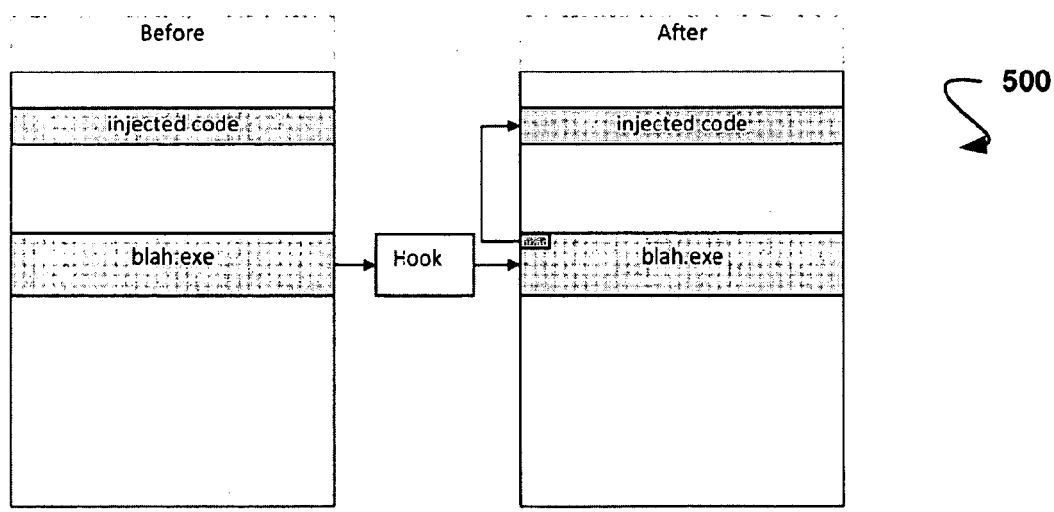

As shown in FIG. 5A, when an executable (referred to as blah.exe) is loaded into an address space 500 of a new process, a driver is notified and code is injected (referred to as injected code) into the address space. Additionally, when the executable is loaded into the address space 500 (and the driver notified), an entry point of the executable is hooked to run the injected code. See FIG. 5B.

Figure 5C:
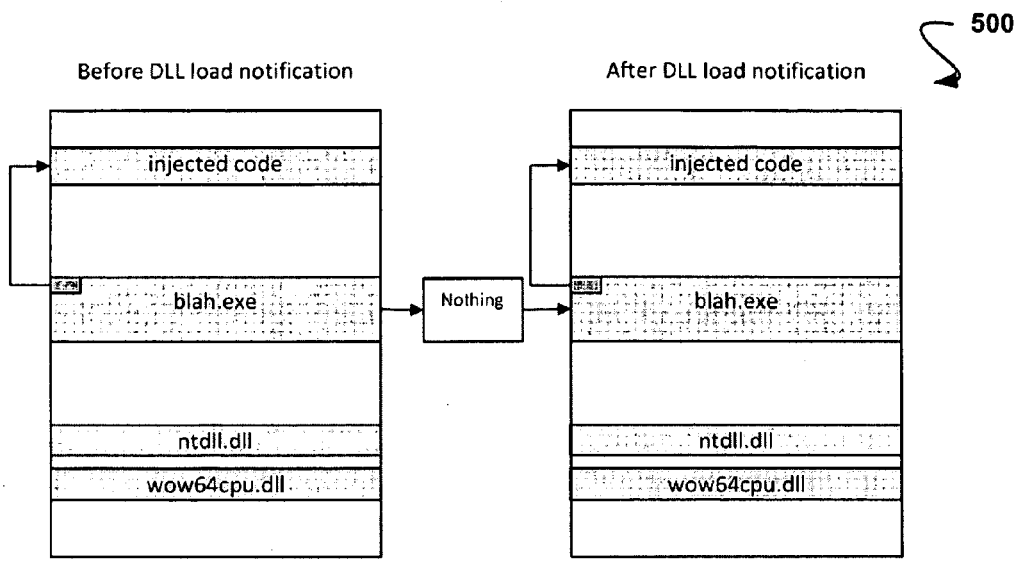
Figure 5D:
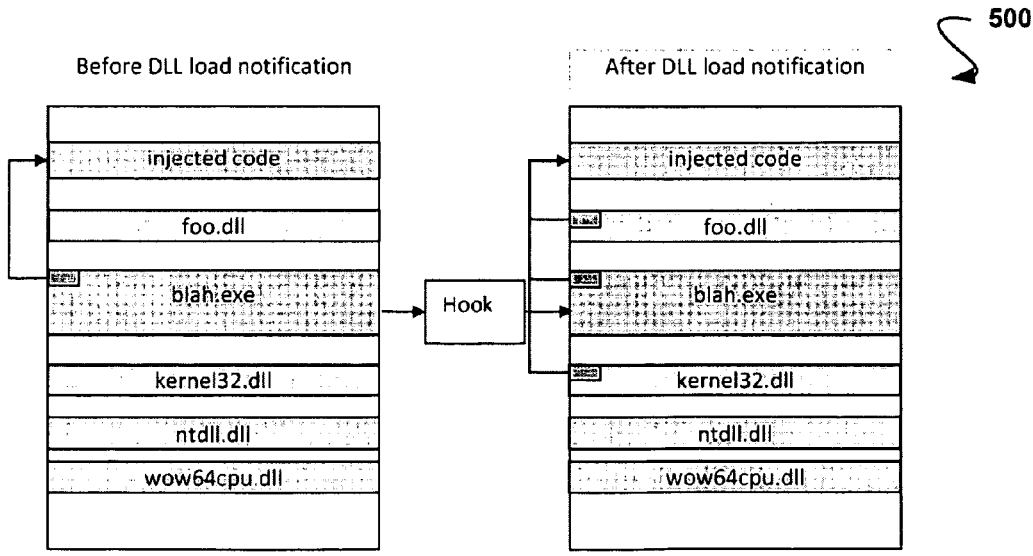

Further, DLLs (referred to as kernel32.dll) being loaded into the address space 500 are identified (e.g. based on a notification from the driver), as shown in FIGS. 5C-5D. However, predetermined DLLs (referred to as ntdll.dll and 64-bit wow64cpu.dll) are ignored, as shown in FIGS. 5C-5D. When the identified DLLs (kernel32.dll) are loaded, an entry point of each such DLL is hooked to run the injected code (see FIG. 5D).

Figure 5E:
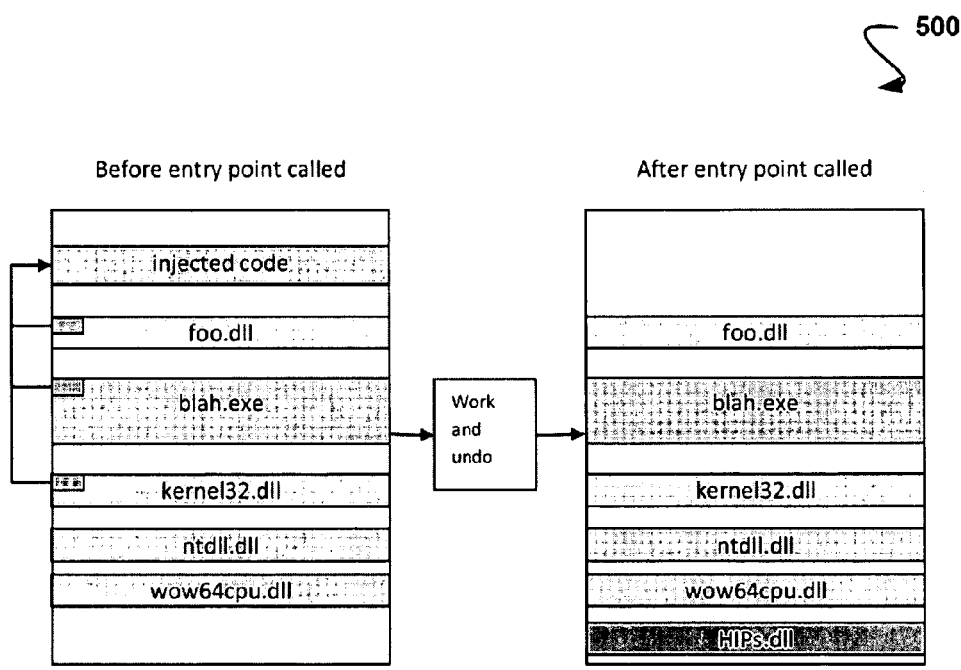

Once a hooked entry point is called, the injected code is executed. As shown in FIG. 5E, execution of the injected code may load a DLL associated with the injected code and may undo the injection of the code and the insertion of the hooks. In this way, the injected code may be executed early within the new process without necessarily relying on undocumented aspects of operating system behavior. In addition, the injected code may be executed in line with a main thread so the injected code may participate cleanly in a locking mechanism employed by any DLLs associated with the process while allowing execution prior to malicious code.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising instructions stored thereon to cause one or more processors to:
   identify creation of a process;
   insert code into an address space of the process prior to execution of the process;
   insert a first hook into an entry point of an executable of the process, the first hook pointing to the inserted code;
   identify whether the first hook has executed;
   wherein if the first hook has not executed, then:
      identify at least one library module being loaded in association with the process;
      determine whether the at least one library module is related to the execution of the inserted code;
      and insert a subsequent hook into an entry point of the at least one library module when it is determined that the at least one library module is not related to the execution of the inserted code, the subsequent hook pointing to the inserted code, wherein the instructions to identify at least one library module, determine, and insert a subsequent hook are repeated for one or more libraries being loaded in association with the process until it is determined that the first hook or the subsequent hook has executed;

and remove each subsequent hook placed at the entry point of the at least one library module, in response to the execution of the inserted code.

2. The computer program product of claim 1, wherein the computer program product is operable such that the creation of the process is identified utilizing a driver that is automatically notified upon creation of the process.

3. The computer program product of claim 1, wherein the computer program product is operable such that the instructions are utilized to monitor for unwanted activity.

4. The computer program product of claim 1, wherein the computer program product is operable such that the instructions are utilized for loading libraries other than the library included in the at least one library module.

5. The computer program product of claim 1, wherein the computer program product is operable such that the at least one library module is identified based on a mapping of the at least one library module into the address space of the process.

6. The computer program product of claim 1, further comprising instructions to cause the one or more processors to identify the entry point of the at least one library module by analyzing a header of the at least one library module.

7. The computer program product of claim 1, wherein the computer program product is operable such that the instructions to cause the one or more processors to hook the inserted code comprise instructions to cause the one or more processors to replace executable code at the entry point of the at least one library module with an instruction to transfer control to the inserted code.

8. The computer program product of claim 1, wherein the computer program product is operable such that the instructions to cause the one or more processors to determine whether the at least one library module is related to the execution of the inserted code comprise instructions to cause the one or more processors to determine whether the at least one library module includes a predetermined module.

9. The computer program product of claim 8, wherein the predetermined module includes a library module predetermined to be referenced by the inserted code.

10. The computer program product of claim 8, wherein the predetermined module includes a main executable associated with the process.

11. The computer program product of claim 8, wherein the process is associated with a 64-bit operating system and the inserted code is 32-bits such that the predetermined module includes a 32-bit module.

12. The computer program product of claim 1, wherein the instructions to cause the one or more processors to determine whether the at least one library module is related to the execution of the inserted code comprise instructions to cause the one or more processors to determine whether the at least one library module is necessary to the execution of the inserted code.

13. A method, comprising:
identifying creation of a process;
inserting code into an address space of the process prior to execution of the process;
inserting a first hook into an entry point of an executable of the process, the first hook pointing to the inserted code;
identifying whether the first hook has executed;
wherein if the first hook has not executed, then:
identifying at least one library module being loaded in association with the process;
determining whether the at least one library module is related to the execution of the inserted code;
and inserting a subsequent hook into an entry point of the at least one library module when it is determined that the at least one library module is not related to the execution of the inserted code, the subsequent hook pointing to the inserted code, wherein the instructions to identify at least one library module, determine, and insert a subsequent hook are repeated for one or more libraries being loaded in association with the process until it is determined that the first hook or the subsequent hook has executed;
and removing each subsequent hook placed at the entry point of the at least one library module, in response to the execution of the inserted code.

14. The method of claim 13, wherein determining whether the at least one library module is related to the execution of the inserted code comprises determining whether the at least one library module is necessary to the execution of the inserted code.

15. A system, comprising:
a memory;
and one or more processors communicatively coupled to the memory and configured to:
identify creation of a process;
insert code into an address space of the process prior to execution of the process;
insert a first hook into an entry point of an executable of the process, the first hook pointing to the inserted code;
identify whether the first hook has executed;
wherein if the first hook has not executed, then:
identify at least one library module being loaded in association with the process;
determine whether the at least one library module is related to the execution of the inserted code;
and insert a subsequent hook into an entry point of the at least one library module when it is determined that the at least one library module is not related to the execution of the inserted code, the subsequent hook pointing to the inserted code, wherein the instructions to identify at least one library module, determine, and insert a subsequent hook are repeated for one or more libraries being loaded in association with the process until it is determined that the first hook or the subsequent hook has executed;
and remove each subsequent hook placed at the entry point of the at least one library module, in response to the execution of the inserted code.

16. The system of claim 15, wherein the one or more processors are further configured to identify the entry point of the at least one library module by analyzing a header of the at least one library module.

17. The system of claim 15, wherein the one or more processors configured to determine whether the at least one library module is related to the execution of the inserted code comprise one or more processors configured to determine whether the at least one library module is necessary to the execution of the inserted code.

* * * * *